US012783488B2

(12) United States Patent
Wang et al.

(10) Patent No.: US 12,783,488 B2
(45) Date of Patent: Nov. 3, 2026

(54) DATA COMPRESSION FOR OPTIMIZED ERROR AND EFFICIENCY

(71) Applicant: INTERNATIONAL BUSINESS MACHINES CORPORATION, Armonk, NY (US)

(72) Inventors: Hongzhi Wang, Santa Bruno, CA (US); Tanveer F. Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/098,483

(22) Filed: Apr. 2, 2025

(65) Prior Publication Data

US 2026/0310647 A1 Oct. 8, 2026

(51) Int. Cl.
*G06F 16/22* (2019.01)
*G06F 7/08* (2006.01)

(52) U.S. Cl.
CPC ............ *G06F 16/2237* (2019.01); *G06F 7/08* (2013.01)

(58) Field of Classification Search
CPC ............................... G06F 16/2237; G06F 7/08
USPC .......................................................... 707/693
See application file for complete search history.

(56) References Cited

U.S. PATENT DOCUMENTS

| | | | | |
|---|---|---|---|---|
| 8,027,380 | B2 * | 9/2011 | Vasilache | H04B 1/7075 375/240 |
| 11,308,152 | B2 * | 4/2022 | Huang | G06F 16/53 |
| 2018/0101570 | A1 * | 4/2018 | Kumar | G06F 16/3347 |
| 2018/0341805 | A1 * | 11/2018 | Jain | G06F 16/583 |
| 2020/0226137 | A1 * | 7/2020 | Zhao | G06F 16/24553 |

FOREIGN PATENT DOCUMENTS

| | | | |
|---|---|---|---|
| CN | 114168588 | A | 3/2022 |
| CN | 117235073 | A | 12/2023 |
| CN | 117407399 | A | 1/2024 |
| CN | 117951346 | B | 5/2024 |
| CN | 118051547 | A | 5/2024 |

(Continued)

OTHER PUBLICATIONS

H. Wang and T. Syeda-Mahmood, "Vector Quantization with Sorting Transformation," IEEE, 2024 IEEE International Conference on Big Data (BigData), Washington, DC, USA, 2024, pp. 2384-2389; Date of Conference: Dec. 15-18, 2024. Date added to IEEE Xplore Jan. 16, 2025. (Year: 2024).*

(Continued)

*Primary Examiner* — Michael Pham
(74) *Attorney, Agent, or Firm* — Seed Intellectual Property Law Group LLP

(57) ABSTRACT

Systems, methods, and computer program products for data compression are disclosed. A method for data compression may comprise reading a first vector belonging to an unsorted vector space; generating, based on the first vector, a first sorted vector belonging to a sorted vector space, the sorted vector space comprising a plurality of vectors; determining a distance between the first sorted vector and each codeword of the plurality; selecting a nearest codeword from the plurality of codewords based on the distances; and providing a compressed representation of the first vector, the compressed representation comprising an identification of the nearest codeword and the first permutation vector.

20 Claims, 12 Drawing Sheets

700

1000

(56) References Cited

FOREIGN PATENT DOCUMENTS

| | | | |
|---|---|---|---|
| CN | 118643144 | A | 9/2024 |
| CN | 118733586 | A | 10/2024 |
| CN | 118861362 | A | 10/2024 |

OTHER PUBLICATIONS

Douze et al., "The Faiss Library", Sep. 6, 2024, pp. 1-24.
Han et al., "A Comprehensive Survey on Vector Database: Storage and Retrieval Technique, Challenge", Oct. 18, 2023, pp. 1-13.

* cited by examiner

DATA COMPRESSION FOR OPTIMIZED ERROR AND EFFICIENCY

BACKGROUND

Embodiments of the present disclosure relate to data compression, and more specifically, to data compression with minimized loss.

BRIEF SUMMARY

According to embodiments of the present disclosure, systems, methods of, and computer program products for data compression are disclosed. Various embodiments of the present disclosure comprise reading a first vector belonging to an unsorted vector space. A first sorted vector belonging to a sorted vector space may be generated based on the first vector. The sorted vector space may comprise a plurality of codewords. Generating the first sorted vector may comprise generating a first permutation vector indicating a position of each element of the first sorted vector in the first vector. A distance between the first sorted vector and each codeword of the plurality may be determined. A nearest codeword may be selected from the plurality of codewords. The nearest codeword may be selected based on the distances. A compressed representation of the first vector may be provided. The compressed representation may comprise an identification of the nearest codeword and the first permutation vector.

According to embodiments of the present disclosure, systems, methods of, and computer program products for conducting a nearest neighbor search are disclosed. A first vector belonging to an unsorted vector space is read. A first sorted vector belonging to a sorted vector space is generated based on the first vector. The sorted vector space may comprise a plurality of sorted vectors. Generating the first sorted vector may comprise generating a first permutation vector indicating a position of each element of the first sorted vector in the first vector. A first distance between the first sorted vector and each other sorted vector of the plurality of sorted vectors may be determined. A subset of the plurality of sorted vectors may be selected. The subset may be selected based on the first distance between the first sorted vector and each other sorted vector. A projected vector may be generated for each sorted vector of the subset. Each projected vector may be generated based on the first permutation vector and a sorted vector. Each projected vector may belong to the unsorted vector space. A second distance between the first vector and the projected vector for each sorted vector of the subset may be determined. A nearest sorted vector from the subset may be selected. The nearest sorted vector may be selected based on the second distances. The nearest sorted vector may be provided.

DETAILED DESCRIPTION

Figure 1A:
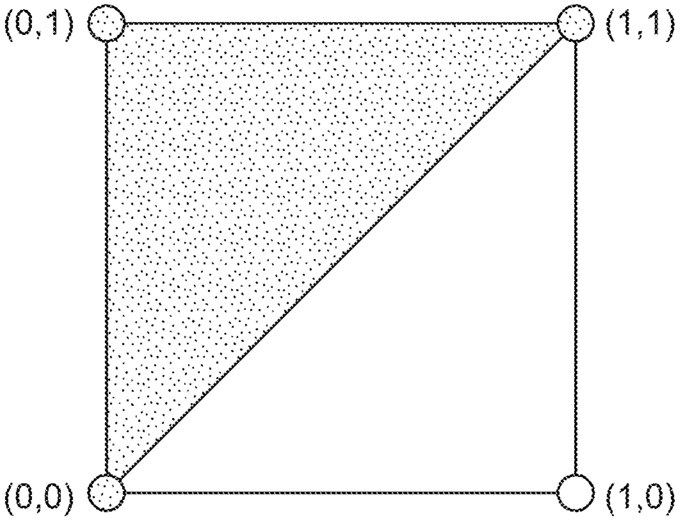
FIG. 1A is a diagram illustrating a two-dimensional vector space, in accordance with one or more embodiments of this disclosure.

Data compression is a technique that reduces the number of bits required to represent or store information. Data compression can improve the efficiency and performance of data transmission, storage, and processing, as well as reduce the cost and energy consumption of data-related applications. Lossy data compression (e.g., using vector quantization) reduces storage requirements and increases transmission at the cost of data quality. Compression error characterizes how much information is lost when compressing data. Various embodiments described herein comprise compressing data with minimized compression error while improving efficiency, scale, and speed.

Codebook generation and nearest neighbor search are the two key components of vector quantization. Previous methods have made progress on improving both fronts through optimizing codebook generation and reducing the searching cost by employing approximate nearest neighbor searching or faster searching algorithms. One or more methods described herein complement these methods and can be applied jointly with them.

Nearest neighbor methods are widely used on vector data in search, retrieval, classification, compression, and/or other applications. Vector quantization is a commonly used compression method based on nearest neighbor representation. Vector quantization comprises creating a collection of codewords to represent the entire vector space. Using vector quantization, a vector of the vector space is represented by its nearest neighbor codeword. The distance between the vector and its nearest neighbor codeword is the compression error for vector quantization.

This technique divides a space into clusters and the centroid of each cluster is used to represent every sample within that cluster. Each centroid is called a codeword and the collection of codewords is called a codebook. Given a sample to be compressed, its nearest neighbor codeword is chosen to represent the sample. Since the size of a codebook is typically smaller than the size of the represented data space, the encoding cost by vector quantization can be reduced.

The compression error produced by vector quantization can be quantified as the distance between the original sample and its nearest neighbor codeword. To reduce compression errors, a commonly used strategy is to increase codebook size, with the downside of increased nearest neighbor searching costs as well as increased storage costs.

Various embodiments described herein comprise applying sorting transformation to vector data such that members within each vector are sorted. Among all permutation transformations, the sorting transformation minimizes L2 distance and maximizes similarity measures such as cosine similarity and Pearson correlation for vector data. Various embodiments described herein reduce compression errors compared to other data compression techniques. Various embodiments described herein may incur storage overhead for saving the sorting permutation for each compressed vector. Through experimental validation on compression and nearest neighbor retrieval, it is shown this is an especially beneficial trade-off for vector quantization on low-dimensional vectors. Vector quantization and other similar data compression techniques are frequently used for low-dimensional vectors.

To reduce compression errors produced by vector quantization, one or more of the embodiments described herein directly minimize the distance between vectors via applying permutation transformations to vector data. It can be proven that among all permutation transformations the sorting transformation optimizes several distance and similarity measures for vector data, including Euclidean distance, cosine similarity, and Pearson correlation. The sorting transformation may sort members within a vector. Compared to standard vector quantization, various embodiments described herein may achieve compression speed improvements while maintaining fast decompression. Various embodiments described herein may require a greater storage overhead for storing sorting permutations for compressed data as compared to vector quantization.

A nearest neighbor representation of a vector represents the vector with its nearest neighbor in a vector space. The quality of the representation depends on how close the vector is to its nearest neighbor. Various embodiments described herein comprise applying permutation transformation(s) to vectors.

Letting $$X_i = \{x_i^1, \ldots, x_i^n\}$$

be a vector of size n, the Euclidean distance between two vectors is:

$$|X_i - X_j| = \sum_{m=1}^{n} (x_i^m - x_j^m)^2$$

To reduce the distance between two vectors, a permutation transformation may be applied to each vector. Let $$\left(x_i^{\pi_i(1)}, \ldots, x_i^{\pi_i(n)}\right) \text{ and } \left(x_j^{\pi_j(1)}, \ldots, x_j^{\pi_j(n)}\right)$$

be a permuted version of $X_i$ and $X_j$, respectively. Various embodiments comprise finding the permutation transformations that minimize the distance between two vectors.

$$\pi_i^*, \pi_j^* = \text{argmin}_{\pi_i, \pi_j} \sum_m \left[x_i^{\pi_i(m)} - x_j^{\pi_j(m)}\right]^2$$

In some implementations, the distance is minimized by permuting one vector and keeping the other vector unchanged. By way of non-limiting example, the optimal permutation is based on the unchanged vector. In some implementations, permutations is applied on both vectors. In some implementations, minimizing Euclidean distance comprises maximizing the dot product of the permuted vectors.

$$\pi_i^*, \pi_j^* = \text{argmin}_{\pi_i, \pi_j} \left(x_i^{\pi_i(1)}, \ldots, x_i^{\pi_i(n)}\right) \cdot \left(x_j^{\pi_j(1)}, \ldots, x_j^{\pi_j(n)}\right)$$

A sorting permutation for a vector sorts the members of the vector. For instance, let π be the ascending sorting permutation for X. Then $X^{\pi(k)} \leq X^{\pi(m)}$ for k<m. Since both cosine similarity and Pearson correlation are also based on vector dot product, the sorting permutation also maximizes cosine similarity and Pearson correlation for vectors.

Applying a sorting transformation to a vector reduces vector distance by projecting vectors from a space of unsorted vectors into a smaller space of sorted vectors. For an n-dimensional vector with no duplicated values, producing a sorted vector may comprise sorting n! unique vectors. Hence, the space of sorted vectors is 1/n! of the space of unsorted vectors.

Figure 1B:
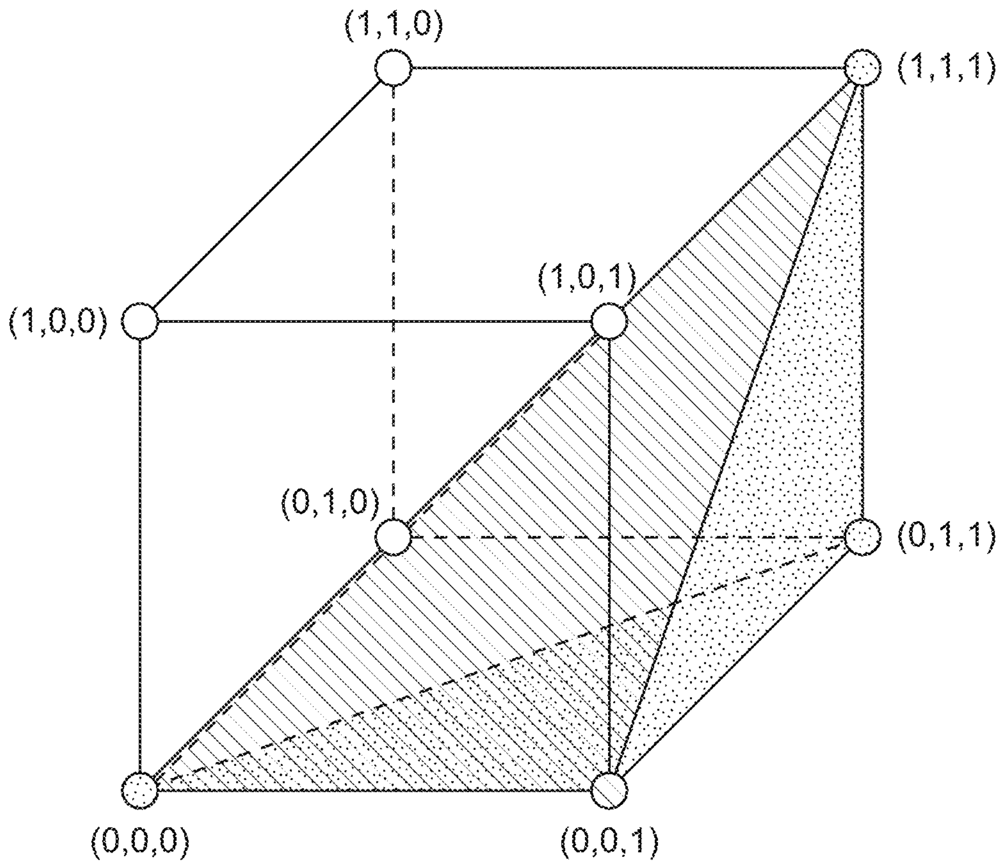
FIG. 1B is a diagram illustrating a three-dimensional vector space, in accordance with one or more embodiments of this disclosure.

FIG. 1A depicts the space of sorted vectors in two dimensions (2D). FIG. 1B depicts the space of sorted vectors in three dimensions (3D). For variables in [0,1], unsorted vectors are distributed in a square and a cube for 2D and 3D, respectively. In contrast, sorted vectors are distributed in the shaded triangle and pyramid for 2D and 3D, respectively.

Figure 2:
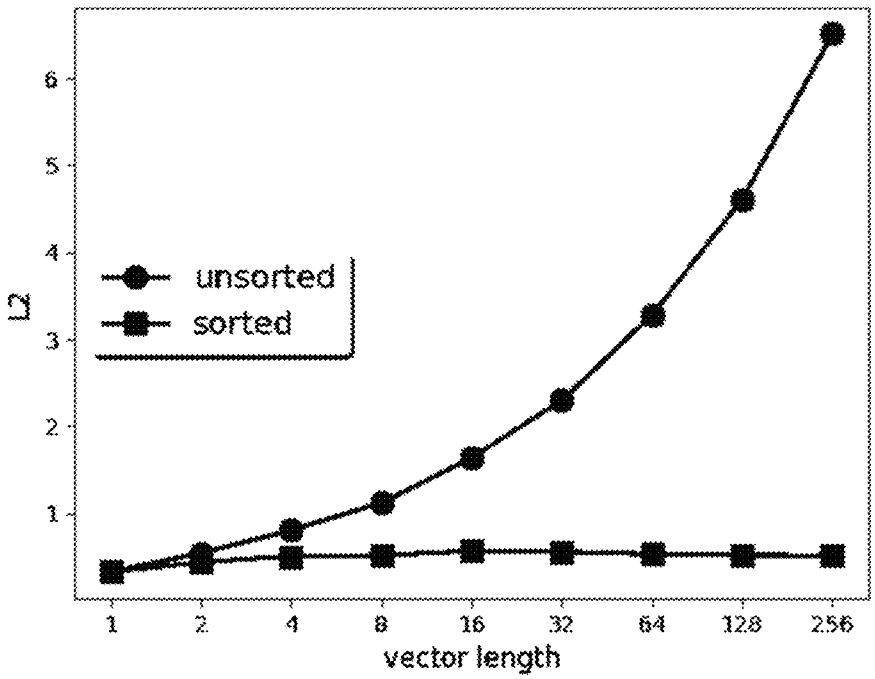
FIG. 2 is a graph illustrating the Euclidean norm of sorted and unsorted vectors of various lengths, in accordance with one or more embodiments of this disclosure.

To demonstrate the effect of sorting transformation on reducing the distance between vectors, 100 vectors of size 1, 2, 4, 8, 16, 32, 64, 128, 256 were generated, respectively. Each vector contains randomly generated real numbers in [0,1]. FIG. 2 depicts the average Euclidean norm for random vectors of various sizes. The average pairwise distances for unsorted and sorted vectors, respectively, are shown in FIG. 2. The Euclidean norm consistently increases for unsorted random vectors as dimension increases but stays mostly constant for sorted vectors.

Vector quantization is a compression technique based on nearest neighbor representations. To encode a data set, vector quantization divides the data into clusters. For example, the data may be divided into clusters using one or more of k-means, hierarchical, spectral, density-based, or fuzzy clustering, and/or another classification method. A centroid may be identified for each cluster. The centroid of a cluster is the center of all samples assigned to the cluster. Each centroid may be identified as a codeword. The collection of codewords may be identified as a codebook.

For data compression using vector quantization, a vector is represented by its nearest neighbor codeword. The compression error is the difference between them. The storage cost for a compressed vector is the cost for encoding its representing codeword. For instance, if 256 codewords are used, 8 bits of storage is needed for each compressed sample.

The codebook size is a key parameter for vector quantization. Employing more codewords reduces compression error, at the price of increased storage and computational cost. Vector dimension is another influencing factor, as the number of codewords needed for reaching certain compression accuracy grows exponentially with respect to the vector dimension. To address this problem, product quantization divides each high dimensional vector into multiple low-dimensional segments and applies vector quantization to compress each vector segment independently.

Various embodiments comprise generating a codebook for sorted vectors. Various embodiments comprise sorting a vector to be compressed to generate a sorted vector and a permutation vector for the vector. The permutation vector may characterize the permutation of the vector that forms the sorted vector. Various embodiments comprise compressing the vector in accordance with the codebook. For example, compressing the vector comprises identifying the nearest codeword to the sorted vector. Compressing the vector may comprise generating a compressed representation of the vector. The compressed representation of the vector may comprise the nearest codeword and the permutation vector. In some implementations, the compressed representation is stored in electronic storage.

Various embodiments comprise decompressing a compressed representation to determine an original vector. Decompressing the compressed representation may comprise transforming the nearest codeword in accordance with the permutation vector. The transformed nearest codeword may be the original vector. Various embodiments comprise providing the original vector.

Figure 3:
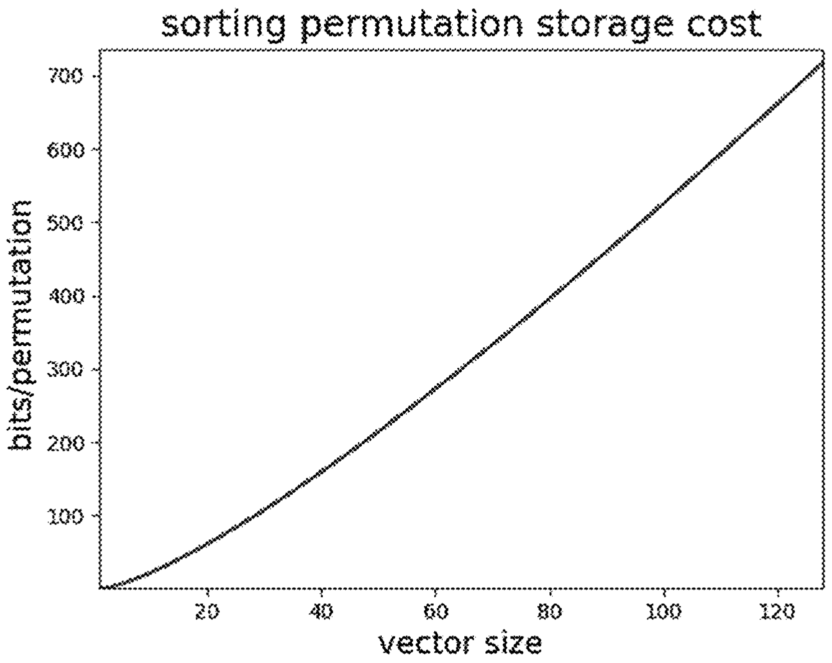
FIG. 3 is a graph illustrating the storage cost for storing sorting permutations, in accordance with one or more embodiments of this disclosure.

In some implementations, the encoding cost for the sorting permutation of a vector of size n is bounded by $\lceil \log_2 (n!) \rceil$. FIG. 3 illustrates the sorting permutation storage costs for vectors of various sizes. As shown in FIG. 3, the storage cost for saving sorting permutations grows approximately linearly with respect to the vector size. The overhead for storing sorting permutations is compensated for by performance improvement.

Various embodiments comprise dividing a vector into low-dimensional segments.

Various embodiments comprise sorting the elements of each low-dimensional segment to generate a plurality of permutation vectors. For example, a permutation vector is generated for each segment. Various embodiments comprise identifying the nearest codeword for each segment. Hence, for each vector, the sorting transformation is applied to sort members within each vector segment before codebook generation and/or compression.

Various embodiments of the present disclosure may be particularly suited for efficient nearest neighbor search for query/retrieval applications. For example, the nearest neighbors of a vector in sorted format may not be the nearest neighbors of the vector in the unsorted format. However, the top nearest neighbors of a query sample are frequently among the top nearest neighbors after applying sorting transformations.

Various embodiments comprise conducting a nearest neighbor search. Conducting the nearest neighbor search may comprise sorting a query sample. Conducting the nearest neighbor search may comprise retrieving a set of l-nearest neighbors for the sorted query sample. Conducting the search may comprise transforming the retrieved neighbors based on a permutation vector characterizing a sorting permutation of the query sample. Conducting the search may comprise ranking the l-nearest neighbors based on the distances of the transformed neighbors to the query sample. Conducting the nearest neighbor search may comprise providing the sample's nearest neighbor among the l retrieved samples is returned. For example, the nearest neighbor according to the ranking is returned.

The methods described herein were tested using the SIFT and GIST descriptor data. Both data sets were derived from natural images. Each SIFT sample has dimension of 128, while each GIST sample has dimension of 960. Both data sets have one million vectors for training. SIFT and GIST have 10000 and 1000 samples for query testing, respectively, The methods described herein were tested based on product quantization implemented by Facebook AI Similarity Search (FAISS). Product quantization has two parameters: 1) segment size which is used to divide the original vector into multiple segments; and 2) vector quantization codebook size for each segment. One or more embodiments described herein may be referred to as sorting-based product quantization (sorted-PQ). To obtain a complete performance profile for product quantization (PQ) and sorting-based product quantization (sorted-PQ), combinations of various segment sizes and codebook sizes were tested. Since large segment sizes usually lead to large compression errors, and poor nearest neighbor retrieval performance, the test was focused on small segment sizes. For GIST data, the test used segment sizes {2,3}, which resulted in 480, 320 segments for each GIST vector, respectively. Since the feature dimension of SIFT descriptors cannot be fully divided by 3, segment sizes {2,4} for the SIFT data set were tested, which resulted in 64 and 32 segments for each SIFT vector, respectively. Codebook sizes of 128, 256, 512, 1024, and 2048 were tested. The codebook sizes correspond to 7-, 8-, 9-, 10-, and 11-bit encoding costs for each segment, respectively. PQ training may comprise building codebooks for each segment. Building a codebook may comprise clustering training data. For example, the training data may be clustered using k-means clustering, hierarchical clustering, density-based clustering, spectral clustering, fuzzy clustering, model-based clustering, and/or another clustering method.

After training, the training samples from each data set were compressed by the corresponding trained model. The compression performance was quantified by compression errors, storage cost (bits/sample) and computational cost. The compression test was conducted on a single Intel® Xeon® Gold 6140 CPU @ 2.30 GHz. The computation time was reported as a measure of the computational cost.

Figure 4:
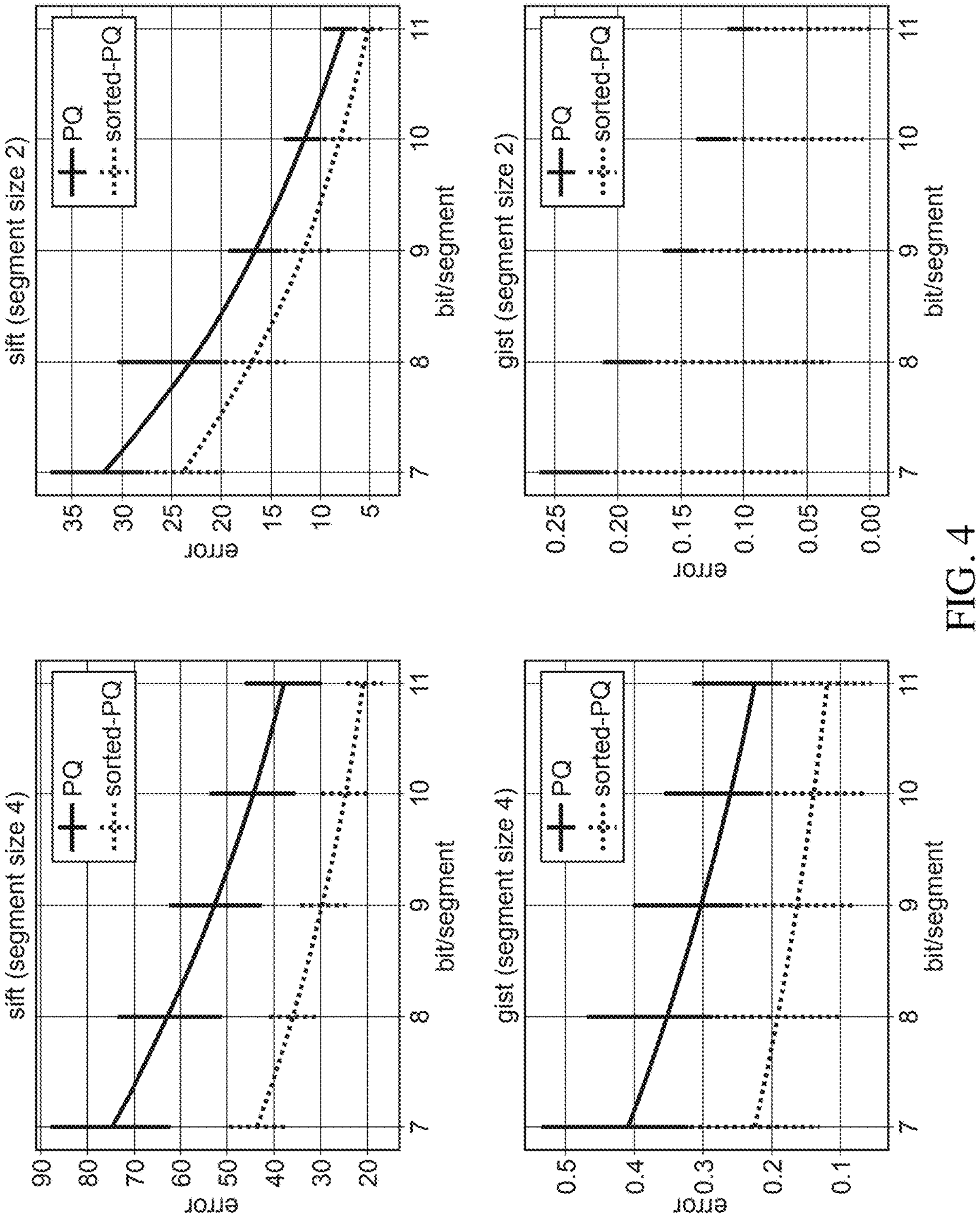
FIG. 4 depicts graphs illustrating error of data compression using product quantization compared to error of data compression according to one or more embodiments of this disclosure.

FIG. 4 shows the compression error produced by each method at various parameter settings. FIG. 4 illustrates compression accuracy (12 error) produced by PQ and sorted-PQ. The x-axes shown in FIG. 4 represent the codebook sizes for each segment in bit/segment. When the same segment size and codebook size were applied, sorted-PQ consistently produced smaller compression errors than PQ. As shown, the advantage is more prominent for larger segment sizes.

Table 1 compares computational and storage cost by PQ and sorted-PQ when they produced comparable compression errors. Since sorted-PQ can achieve similar compression accuracy as PQ with smaller codebook sizes, sorted-PQ greatly reduced compression computational cost than PQ. For segment size 3 and 4, sorted-PQ is 3 to 4 times faster than PQ, with ~10-20% additional storage cost. For segment size 2, sorted-PQ reduced computational cost by ~20% to 40% with no additional storage cost. Overall, the storage overhead of sorted-PQ for storing sorting permutations is well compensated.

| method | compression error | CPU time (second) | bits/sample |
|---|---|---|---|
| SIR PQ (4,10) | 44.31 | 71.36 | 32 × 10 |
| sift sorted-PQ (4,7) | 43.12 | 20.54 | 32 × 12 |
| sift PQ (4,11) | 37.63 | 130.51 | 32 × 11 |
| silt sorted PQ (4,8) | 35.61 | 28.20 | 32 × 13 |
| sift PQ (2,8) | 22.71 | 29.64 | 64 × 8 |
| sift sorted-PQ (2,7) | 23.69 | 22.79 | 64 × 8 |
| sift PQ (2,9) | 16.10 | 51.35 | 64 × 9 |
| sift sorted-PQ (2,8) | 16.63 | 33.26 | 64 × 9 |
| sift PQ (2, 10) | 11.24 | 83.41 | 64 × 10 |
| sift sorted PQ (2,9) | 11.50 | 53.46 | 64 × 10 |
| sift PQ (2,11) | 7.68 | 151.45 | 64 × 11 |
| sift sorted-PQ (2,10) | 7.86 | 86.26 | 64 × 11 |
| gist PQ (3,9) | 0.206 | 2564.5 | 320 × 9 |
| gist sorted-PQ (3,7) | 0.195 | 775.7 | 320 × 10 |
| gist PQ (3,10) | 0.170 | 5327.1 | 320 × 10 |
| gist sorted-PQ (3,8) | 0.160 | 1197.3 | 320 × 11 |
| gist PQ (3,11) | 0.141 | 11029.1.5 | 320 × 11 |
| gist sorted-PQ (3,9) | 0.128 | 2659.5 | 320 × 12 |
| gist PQ (2,8) | 0.133 | 157.7 | 480 × 8 |
| gist sorted-PQ (2,7) | 0.133 | 116.1 | 480 × 8 |
| gist PQ (2,9) | 0.098 | 278.9 | 480 × 9 |
| gist sorted-PQ (2,8) | 0.103 | 183.2 | 480 × 9 |
| gist PQ (2,10) | 0.075 | 532.3 | 480 × 1- |
| gist sorted-PQ (2,9) | 0.075 | 303.6 | 480 × 10 |
| gist PQ (2,11) | 0.058 | 987.8 | 480 × 11 |
| gist sorted-PQ (2.10) | 0.057 | 555.7 | 480 × 11 |

Figure 5:
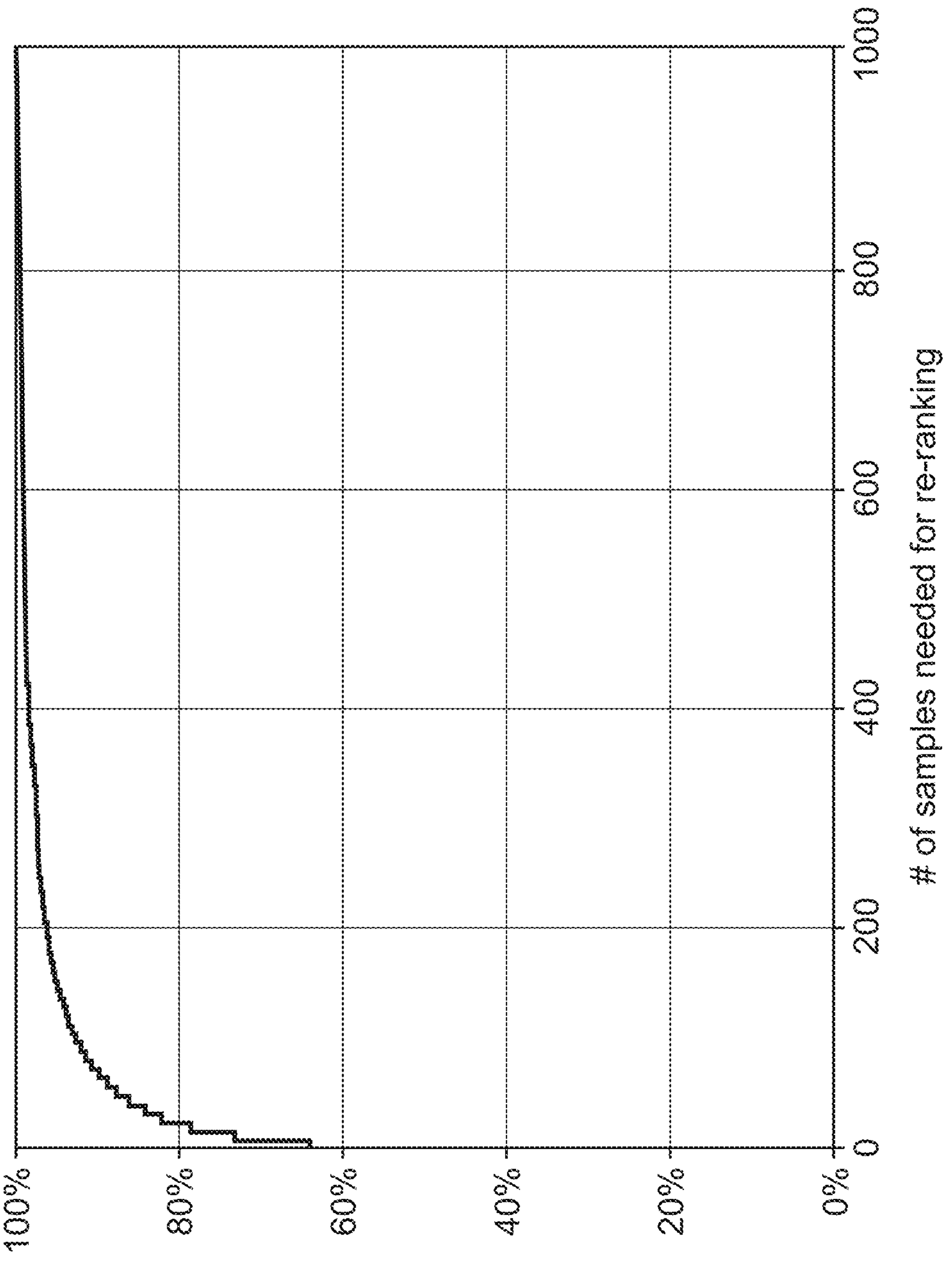
FIG. 5 is a graph illustrating the accumulative distribution illustrating the number of sorted samples to retrieve in order to retrieve a vector's nearest neighbor, in accordance with one or more embodiments of this disclosure.

FIG. 5 shows the accumulative distribution of how many samples need to be retrieved for sorted-PQ re-ranking to recover the nearest neighbor after unsorting. The distribution was computed across 1000 randomly selected SIFT training samples. The results were based on sorted-PQ with segment size 4 and codebook size 8 bits/segment.

To get insights on how sorting transformation may affect nearest neighbor retrieval, experimental studies were conducted using the SIFT data set to evaluate how sorting transformation affects the nearest neighbor rankings. To this end, 1000 SIFT training samples were randomly selected. For each of them, its true nearest neighbor among the one million training data (excluding itself) based on sorted-PQ compression was retrieved. This was done by first compressing and then decompressing all training samples using sorted-PQ. The nearest neighbor of a query sample among all decompressed training samples is its true nearest neighbor based on sorted-PQ compression. Its ranking position was produced by comparing the sorted query sample and all sorted decompressed training samples shows how many samples need to be retrieved for re-ranking to recover the true nearest neighbor based on sorted-PQ compression. FIG. 5 shows the accumulative distribution of how many samples need to be retrieved for sorted-PQ re-ranking to recover the nearest neighbor for the 1000 randomly selected training samples. For most samples, their nearest neighbors are still top ranked after applying sorting transformations.

Testing retrieval comprised, for each testing query data, retrieving its nearest neighbor among the training data set. The nearest neighbors were retrieved using the following three methods: 1) original values used for both query and training samples; 2)-3) original values used for query samples, while the training samples are compressed using PQ and sorted-PQ, respectively. For evaluation, the retrieval results produced by the two PQ methods were respectively compared with the retrieval results produced using original data, under the assumption that retrievals produced based on better compression should produce higher overlaps with retrievals produced on original data. For this test, the same segment size and bits/segment parameters were applied. For sorted-PQ, l=128 was applied for re-ranking.

Figure 6:
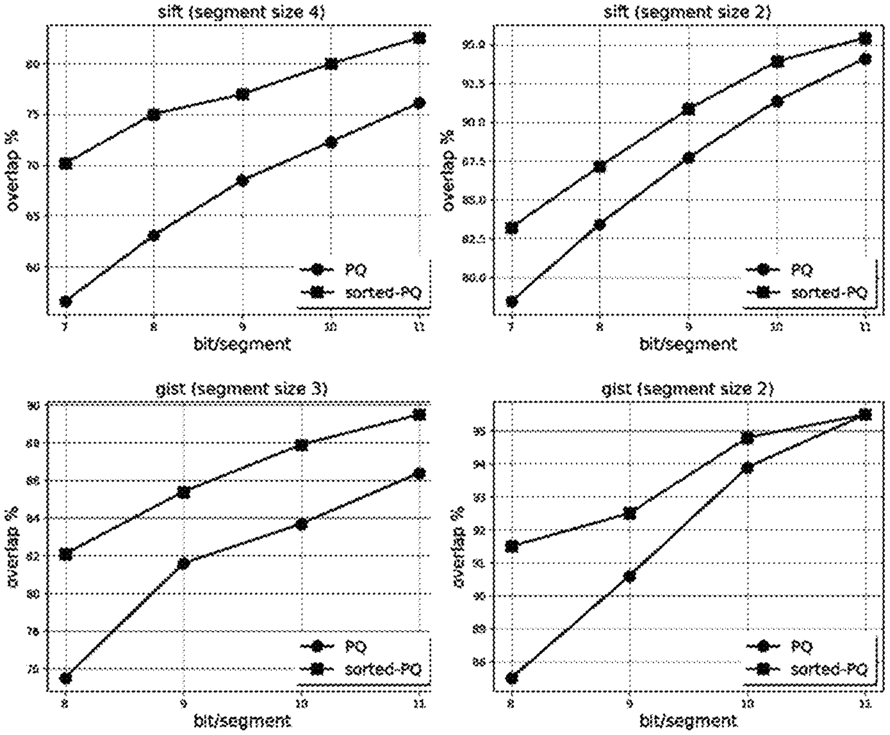
FIG. 6 depicts graphs illustrating retrieval results, in accordance with one or more embodiments of this disclosure.

FIG. 6 shows the retrieval results. FIG. 6 illustrates the nearest neighbor retrieval overlaps between retrieval on original data and retrieval on PQ and sorted-PQ, respectively. Employing larger codebooks resulted in better search performance for both methods. When the same segment and codebook sizes were applied, sorted-PQ consistently outperformed PQ.

Applying one or more of the methods described herein minimizes Euclidean distance and maximizes cosine similarity and Pearson correlation for vector data. In experimental validation, it is shown that the methods described herein prominently improved compression and nearest neighbor retrieval performance for product quantization.

It can be proven by induction that applying sorting permutations to vectors maximizes the dot product of the permuted vectors. The proof by induction that among all permutations the sorting permutation maximizes the dot product between any vectors as in is shown. The sorting transformation maximizes cosine similarity and Pearson correlation between any vectors.

Without loss of generality, ascending sorting transformations are considered in this proof. The same proof can be applied to descending sorting transformations as well. Let $\pi_i$ and $\pi_j$ be ascending sorting permutation for $X_i$ and $X_j$, respectively. For size 2 vectors, $$x_i^{\pi_i(1)} \le x_i^{\pi_i(2)},\ x_j^{\pi_j(1)} \le x_j^{\pi_j(2)}.$$

The following is shown:

$$x_i^{\pi_i(1)}x_j^{\pi_j(1)} + x_i^{\pi_i(2)}x_j^{\pi_j(2)} - \left[x_i^{\pi_i(1)}x_j^{\pi_j(2)} + x_i^{\pi_i(2)}x_j^{\pi_j(1)}\right] = \left[x_i^{\pi_i(2)} - x_i^{\pi_i(1)}\right]\left[x_j^{\pi_j(2)} - x_j^{\pi_j(1)}\right] \ge 0$$

Hence, the sorting transformation maximizes the dot product between any vectors of size 2.

If the sorting transformation maximizes the dot product between any vectors of size n, it is proven that the sorting transformation also maximizes the dot product between any vectors of size n+1. Given two sorted vectors of size $$n+1\left(x_i^{\pi_i(1)}, \ldots, x_i^{\pi_i(n+1)}\right) \text{ and } \left(x_j^{\pi_j(1)}, \ldots, x_j^{\pi_j(n+1)}\right),$$

suppose that the permutations that maximize the dot product of the two permuted vectors pair $$x_i^{\pi_i(1)} \text{ with } x_j^{\pi_j(m)}.$$

If m=1, then the sorting transformation maximizes the dot product between permuted vectors for vectors of size n+1 because $$\left(x_i^{\pi_i(2)}, \ldots, x_i^{\pi_i(n+1)}\right) \text{ and } \left(x_j^{\pi_j(2)}, \ldots, x_j^{\pi_j(n+1)}\right)$$

maximizes the dot product of the remaining vectors. If m≠1, the maximal dot product between the two permuted vectors is $$x_i^{\pi_i(1)} x_j^{\pi_j(m)} + \left(x_i^{\pi_i(2)}, \ldots, x_i^{\pi_i(n+1)}\right) \cdot \left(x_j^{\pi_j(1)}, \ldots, x_j^{\pi_j(m-1)}, x_j^{\pi_j(m+1)}, \ldots, x_j^{\pi_j(n+1)}\right)$$

Subtracting the above equation from $$\left(x_i^{\pi_i(1)}, \ldots, x_i^{\pi_i(n+1)}\right) \cdot \left(x_j^{\pi_j(1)}, \ldots, x_j^{\pi_j(n+1)}\right)$$

equals $$x_i^{\pi_i(1)}\left[x_j^{\pi_j(1)} - x_j^{\pi_j(m)}\right] + \sum_{k=2}^{m} x_i^{\pi_i(k)}\left[x_j^{\pi_j(k)} - x_j^{\pi_j(k-1)}\right] \geq$$

$$x_i^{\pi_i(1)}\left[x_j^{\pi_j(1)} - x_j^{p_j(m)}\right] + \sum_{k=2}^{m} x_i^{\pi_i(2)}\left[x_j^{\pi_j(k)} - x_j^{\pi_j(k-1)}\right] =$$

$$x_i^{\pi_i(1)}\left[x_j^{\pi_j(1)} - x_j^{\pi_j(m)}\right] + x_i^{\pi_i(2)}\left[x_j^{\pi_j(m)} - x_j^{\pi_j(1)}\right] = \left[x_i^{\pi_i(2)} - x_i^{\pi_i(1)}\right]\left[x_j^{\pi_j(m)} - x_j^{\pi_j(1)}\right] \geq 0.$$

Hence, it is impossible to have m≠1. If the sorting transformation maximizes the dot product between any vectors of size n, it also maximizes the dot product between any vectors of size n+1. By induction, the sorting transformation maximizes the dot product between vectors of any sizes.

Cosine similarity and Pearson correlation on vectors are respectively defined as follows:

$$S_C(X_i, X_j) = \frac{X_i \cdot X_j}{\|X_i\|\|X_j\|}$$

$$r(X_i, X_j) = \frac{X_i \cdot X_j - n\overline{X}_i\overline{X}_j}{\sqrt{\sum_k \left(x_i^k - \overline{X}_i\right)^2}\sqrt{\sum_k \left(x_j^k - \overline{X}_j\right)^2}}$$

For both measures, applying permutation transformation to vectors only affects the dot product component. Hence, the sorting permutation also maximizes cosine similarity and Pearson correlation between any vectors.

Figure 7:
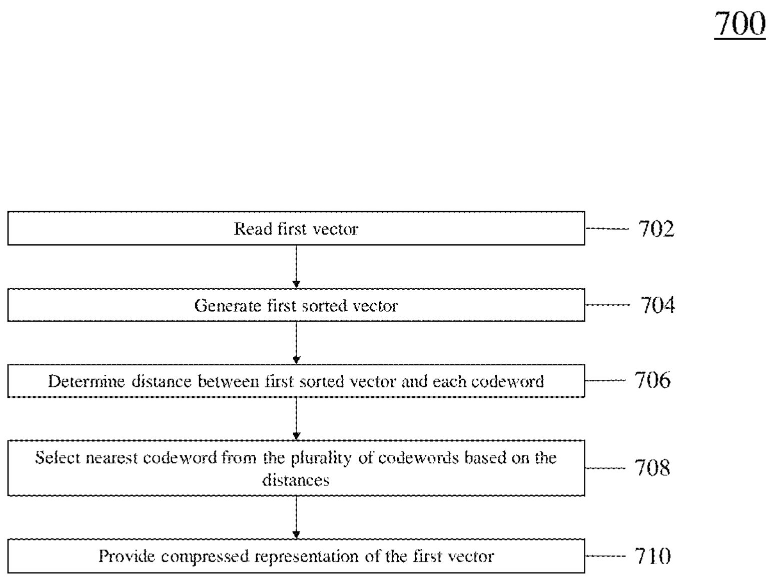
FIG. 7 is a flow diagram depicting an exemplary method of compressing data, in accordance with one or more embodiments of this disclosure.

Referring now to FIG. 7, a flowchart illustrating an exemplary method 700 for compressing data is depicted. The operations of method 700 presented below are intended to be illustrative. In some implementations, method 700 is accomplished with one or more additional operations not described and/or without one or more of the operations discussed. The operations of method 700 may be performed in another order. Additionally, the order in which the operations of method 700 are illustrated in FIG. 7 and described below is not intended to be limiting.

In some implementations, method 700 is implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 700.

Operation 702 may comprise reading a first vector. The first vector may belong to an unsorted vector space. The unsorted vector space may comprise sorted and/or unsorted vectors. For example, all vectors of the unsorted vector space have the same dimensionality.

Operation 704 may comprise generating a first sorted vector belonging to a sorted vector space. The first sorted vector may be generated based on the first vector. The sorted vector space may comprise a plurality of sorted vectors. The plurality of sorted vectors may comprise a plurality of codewords. The plurality of codewords may form a codebook. Generating the first sorted vector may comprise sorting the elements of the first vector. Generating the first sorted vector may comprise generating a first permutation vector. The first permutation vector may be generated based on one or more permutation transformations applied to the first vector to generate the first sorted vector.

Generating a permutation vector may comprise generating an associated permutation matrix. A permutation matrix is a square matrix that is a row (or column) permutation of the identity matrix. A permutation matrix may be equivalent to its associated permutation vector. Generating a permutation vector may comprise compressing its associated permutation matrix into vector form. Permutation vectors may be configured such that multiplying a vector by a permutation vector applies a permutation transformation to the codeword. For example, the first permutation vector is associated with a first permutation. The first permutation may be the inverse of the permutation transformation applied to the first vector to generate the sorted vector. For example, permuting the first sorted vector in accordance with the first permutation generates the first vector. The first permutation vector may indicate a position of each element of the first sorted vector in the first vector. For example, the position may be an index of that element in the first vector.

Operation 706 may comprise determining a distance for each codeword of the plurality. The distance for a codeword may be the distance between the first sorted vector and that codeword. The distance may be determined using Euclidean distance, cosine similarity, cosine similarity, Manhattan distance, Hamming distance, and/or another distance metric.

Operation 708 may comprise selecting a nearest codeword from the plurality of codewords. In some implementations, the nearest codeword is selected based on the distances. The nearest codeword may have the smallest distance of the plurality of codewords. In some implementations, the nearest codeword has the largest distance of the plurality of codewords. Selecting the nearest codeword may comprise ranking the codewords based on the distances. Selecting the nearest codeword may comprise selecting the codeword having the most optimal distance.

Operation 710 may comprise providing a compressed representation of the first vector. The compressed representation may comprise an identification of the nearest codeword and the first permutation vector. Providing the compressed representation may comprise outputting the compressed representation. Providing the compressed representation may comprise presenting the compressed representation to a user via a user interface. Providing the compressed representation may comprise storing the compressed representation in electronic storage.

Providing the compressed representation may comprise providing the compressed representation as input to a computer program.

In some implementations, a request to compress a high-dimensional vector is read. A high-dimensional vector may be any vector having at least 10 elements and/or requiring at least 10 bits of storage. The high-dimensional vector may be divided into a plurality of segments. Each segment may be compressed according to one or more operations of method 700. For example, a codeword is identified and a permutation vector is generated for each segment. The identified codewords and the permutation vector may be aggregated to form a compressed representation of the high-dimensional vector.

Figure 8:
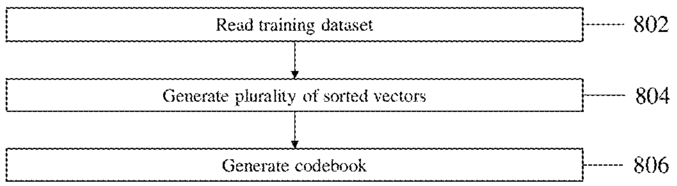
FIG. 8 is a flow diagram depicting an exemplary method of generating a codebook, in accordance with one or more embodiments of this disclosure.

Referring now to FIG. 8, a flowchart illustrating an exemplary method 800 for compressing data is depicted. The operations of method 800 presented below are intended to be illustrative. In some implementations, method 800 is accomplished with one or more additional operations not described and/or without one or more of the operations discussed. The operations of method 800 may be performed in another order. Additionally, the order in which the operations of method 800 are illustrated in FIG. 8 and described below is not intended to be limiting.

In some implementations, method 800 is implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 800.

Operation 802 may comprise reading a training dataset. The training dataset may comprise a plurality of vectors. Each vector of the plurality of vectors may belong to the unsorted vector space. Operation 804 may comprise generating a plurality of sorted vectors. Generating the plurality of sorted vectors may comprise sorting each vector of the plurality of vectors. The sorted vectors of the plurality of sorted vectors may each belong to the sorted vector space.

Operation 806 may comprise generating a codebook comprising a plurality of codewords. The plurality of codewords may be a subset of the plurality of sorted vectors. Generating the codebook may comprise clustering the plurality of sorted vectors in the sorted vector space. The plurality of sorted vectors may be clustered using k-means clustering, hierarchical clustering, density-based clustering, spectral clustering, fuzzy clustering, model-based clustering, and/or another clustering method. For example, the centroid of each cluster is included in the plurality of codewords.

Figure 9:
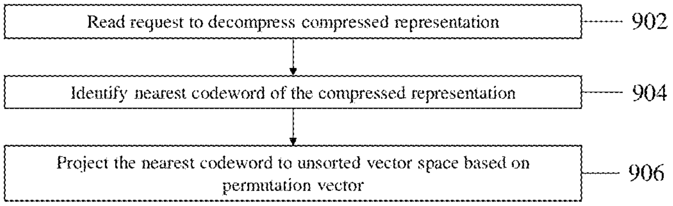
FIG. 9 is a flow diagram depicting an exemplary method of decompressing data, in accordance with one or more embodiments of this disclosure.

Referring now to FIG. 9, a flowchart illustrating an exemplary method 900 for decompressing data is depicted. The operations of method 900 presented below are intended to be illustrative. In some implementations, method 900 is accomplished with one or more additional operations not described and/or without one or more of the operations discussed. The operations of method 900 may be performed in another order. Additionally, the order in which the operations of method 900 are illustrated in FIG. 9 and described below is not intended to be limiting.

In some implementations, method 900 is implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 900.

Operation 902 may comprise reading a request to decompress a compressed representation of a vector. The compressed representation may comprise a codeword and a permutation vector. Operation 904 may comprise reading the codeword and the permutation vector. Operation 906 may comprise projecting the codeword to the unsorted vector space based on the permutation vector.

Figure 10:
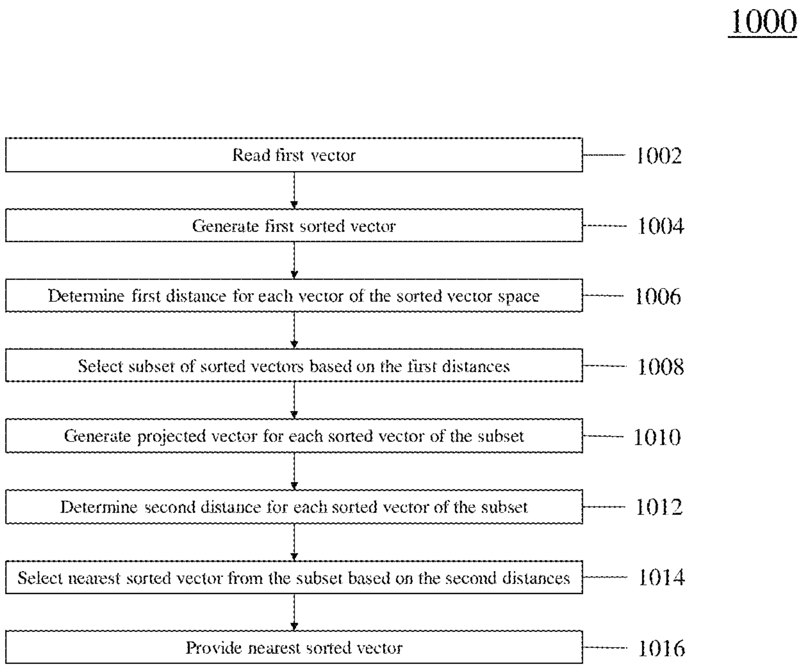
FIG. 10 is a flow diagram depicting an exemplary method of conducting a nearest neighbor search, in accordance with one or more embodiments of this disclosure.

Referring now to FIG. 10, a flowchart illustrating an exemplary method 1000 for conducting a nearest neighbor search is depicted. The operations of method 1000 presented below are intended to be illustrative. In some implementations, method 1000 is accomplished with one or more additional operations not described and/or without one or more of the operations discussed. The operations of method 1000 may be performed in another order. Additionally, the order in which the operations of method 1000 are illustrated in FIG. 10 and described below is not intended to be limiting.

In some implementations, method 1000 is implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 1000.

Operation 1002 may comprise reading a first vector. A vector is a collection of elements. Each element of a vector may have a specific value and/or position in that vector. The first vector may belong to an unsorted vector space. The unsorted vector space may comprise sorted and/or unsorted vectors. All vectors of a vector space may have the same dimensionality. For example, all vectors of the sorted vector space have the same dimensionality. For example, all vectors of a vector space have the same number and/or organization of elements.

Operation 1004 may comprise generating a first sorted vector belonging to a sorted vector space. The first sorted vector may be generated based on the first vector. The sorted vector space may comprise a plurality of sorted vectors. Generating the first sorted vector may comprise sorting the elements of the first vector. Generating the first sorted vector may comprise generating a first permutation vector. The first permutation vector may be generated based on one or more permutation transformations applied to the first vector to generate the first sorted vector.

For example, the first permutation vector is associated with a first permutation. The first permutation may be the inverse of the permutation transformation applied to the first vector to generate the sorted vector. For example, permuting the first sorted vector in accordance with the first permutation generates the first vector. The first permutation vector may indicate a position of each element of the first sorted vector in the first vector. For example, the position may be an index of that element in the first vector.

Operation 1006 may comprise determining a first distance for each other sorted vector of the plurality. The first distance for a sorted vector may be a distance between the first sorted vector and that sorted vector. The first distance may be determined using Euclidean distance, cosine similarity, cosine similarity, Manhattan distance, Hamming distance, and/or another distance metric.

Operation 1008 may comprise selecting a subset of the plurality of sorted vectors. The subset may be selected based on the first distances. For example, the subset may have a predetermined size n, where n is at least one. Selecting the subset may comprise ranking the sorted vectors of the plurality of sorted vectors based on the first distances. Selecting the subset may comprise identifying the sorted vectors with the n most optimal first distances. In some implementations, a higher first distance is more optimal (e.g., when using cosine similarity). In some implementations, a lower first distance is more optimal.

Operation 1010 may comprise generating a projected vector for each sorted vector of the subset. The projected vectors may be generated based on the first permutation vector and each sorted vector of the subset. The projected vector for a sorted vector may belong to the unsorted vector space. Each sorted vector of the subset may be projected such that the permutation transformation applied to the first vector is applied to that sorted vector.

Operation 1012 may comprise determining a second distance for each sorted vector of the subset. The second distance for a sorted vector may be the distance between the first vector and the projected vector for that sorted vector. The second distance may be determined using Euclidean distance, cosine similarity, cosine distance, Manhattan distance, Hamming distance, and/or another distance metric.

Operation 1014 may comprise selecting a nearest sorted vector from the subset. The nearest sorted vector may have the smallest second distance of the subset. In some implementations, the nearest sorted vector has the largest second distance of the subset. Selecting the nearest sorted vector may comprise ranking the sorted vectors based on the second distances. Selecting the nearest sorted vector may comprise selecting the sorted vector having the most optimal second distance. In some implementations, the top k-nearest sorted vectors are selected from the subset.

Operation 1016 may comprise providing the nearest sorted vector. In some implementations, the projected vector for the nearest sorted vector is provided. In some implementations, the top k-nearest sorted vectors are provided. Providing a vector may comprise presenting the vector to a user via a user interface. Providing a vector may comprise storing the vector in electronic storage. Providing a vector may comprise providing the vector as input to a computer program.

In some implementations, a request to search for the k-nearest neighbors of a high-dimensional vector is read. A high-dimensional vector may be any vector having at least 10 elements and/or requiring at least 10 bits of storage. The high-dimensional vector may be divided into a plurality of segments. The k-nearest neighbors may be identified for each segment according to one or more operations of method 1000. For example, one or more vectors are identified for each segment. The identified vectors may be aggregated to form a nearest neighbor representation of the high-dimensional vector.

Figure 11:
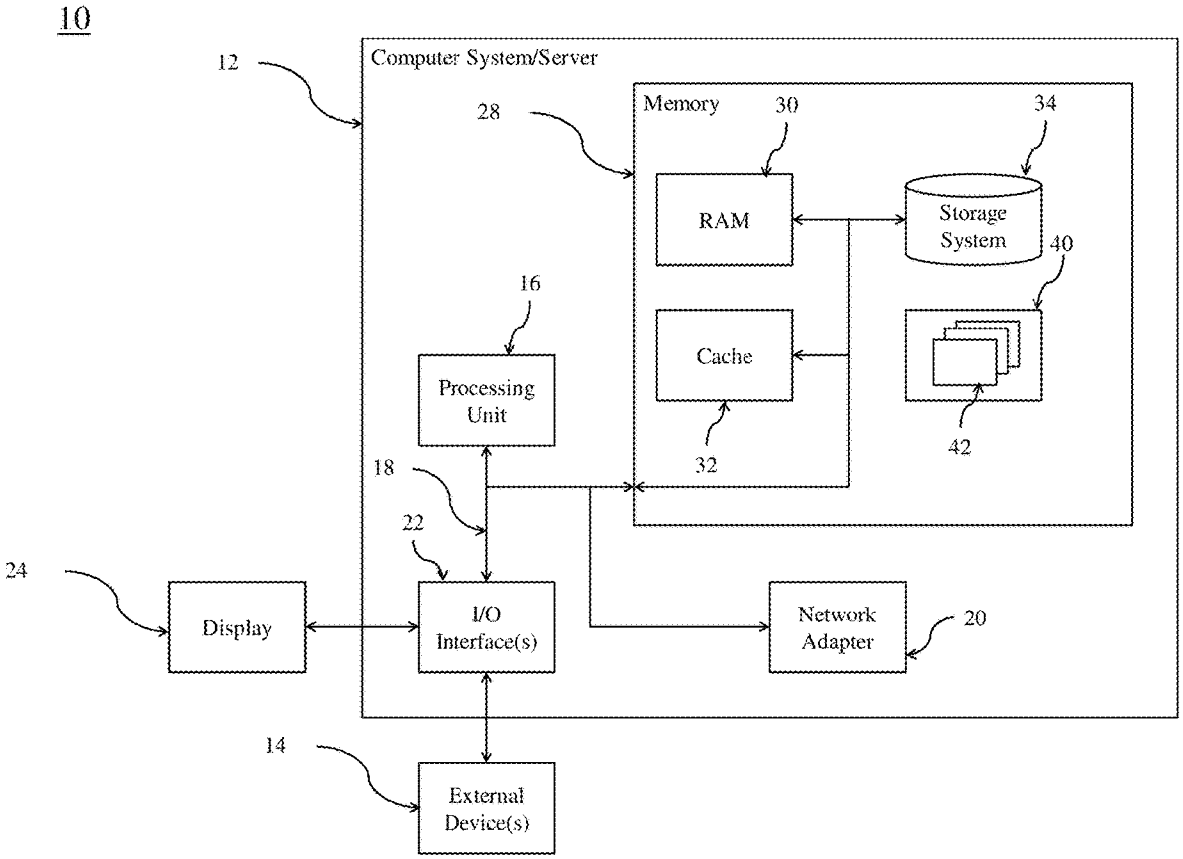
FIG. 11 depicts a computing node according to one or more embodiments of the present disclosure.

As shown in FIG. 11, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of compressing data, the method comprising:

reading a first vector belonging to an unsorted vector space;

generating, based on the first vector, a first sorted vector belonging to a sorted vector space, the sorted vector space comprising a plurality of codewords, wherein generating the first sorted vector comprises generating a first permutation vector indicating a position of each element of the first sorted vector in the first vector;

determining a distance between the first sorted vector and each codeword of the plurality of codewords;

selecting a nearest codeword from the plurality of codewords based on the distances; and providing a compressed representation of the first vector, the compressed representation comprising an identification of the nearest codeword and the first permutation vector.

2. The method of claim 1, the method further comprising:

reading a training dataset comprising a plurality of vectors belonging to the unsorted vector space;

sorting each vector of the plurality of vectors to generate a plurality of sorted vectors belonging to the sorted vector space; and clustering the plurality of sorted vectors in the sorted vector space to generate a codebook comprising the plurality of codewords.

3. The method of claim 2, wherein said clustering comprises performing k-means clustering on the sorted vector space.

4. The method of claim 1, further comprising:

reading a request to compress a high-dimensional vector;

dividing the high-dimensional vector into a plurality of segments; and compressing each of the plurality of segments.

5. The method of claim 4, wherein the high-dimensional vector is a vector having at least 10 elements.

6. The method of claim 1, wherein said determining the distance comprises determining a Euclidean distance between the first sorted vector and that codeword.

7. The method of claim 1, further comprising:

reading a request to decompress the compressed representation;

identifying the nearest codeword of the compressed representation; and projecting the nearest codeword to the unsorted vector space based on the first permutation vector.

8. The method of claim 1, wherein the nearest codeword has the smallest distance of the plurality of codewords.

9. A method of conducting a nearest neighbor search:

reading a first vector belonging to an unsorted vector space;

generating, based on the first vector, a first sorted vector belonging to a sorted vector space, the sorted vector space comprising a plurality of sorted vectors, wherein generating the first sorted vector comprises generating a first permutation vector indicating a position of each element of the first sorted vector in the first vector;

determining, for each sorted vector of the plurality of sorted vectors, a first distance between the first sorted vector and that sorted vector;

selecting a subset of the plurality of sorted vectors based on the first distance between the first sorted vector and each sorted vector;

generating, for each sorted vector of the subset, a projected vector based on the first permutation vector and that sorted vector, each projected vector belonging to the unsorted vector space;

determining, for each sorted vector of the subset, a second distance between the first vector and the projected vector for that sorted vector;

selecting a nearest sorted vector from the subset based on the second distances; and providing the nearest sorted vector.

10. The method of claim 9, wherein said determining the first distance comprises determining a Euclidean distance between the first vector and that sorted vector, and said determining the second distance comprises determining a Euclidean distance between the first vector and the projected vector for that sorted vector.

11. The method of claim 9, wherein the nearest sorted vector has the smallest second distance of the subset.

12. A computer program product comprising:

one or more computer-readable storage media; and program instructions stored on the one or more computer-readable storage media to perform operations comprising:

reading a first vector belonging to an unsorted vector space;

generating, based on the first vector, a first sorted vector belonging to a sorted vector space, the sorted vector space comprising a plurality of codewords, wherein generating the first sorted vector comprises generating a first permutation vector indicating a position of each element of the first sorted vector in the first vector;

determining a distance between the first sorted vector and each codeword of the plurality of codewords;

selecting a nearest codeword from the plurality of codewords based on the distances; and providing a compressed representation of the first vector, the compressed representation comprising an identification of the nearest codeword and the first permutation vector.

13. The computer program product of claim 12, the operations further comprising:

reading a training dataset comprising a plurality of vectors belonging to the unsorted vector space;

sorting each vector of the plurality of vectors to generate a plurality of sorted vectors belonging to the sorted vector space; and clustering the plurality of sorted vectors in the sorted vector space to generate a codebook comprising the plurality of codewords.

14. The computer program product of claim 13, wherein said clustering comprises performing k-means clustering on the sorted vector space.

15. The computer program product of claim 12, wherein said determining the distance comprises determining a Euclidean distance between the first sorted vector and that codeword.

16. The computer program product of claim 12, the operations further comprising:

reading a request to decompress the compressed representation;

identifying the nearest codeword of the compressed representation; and projecting the nearest codeword to the unsorted vector space based on the first permutation vector.

17. A computer system comprising:

a processor set;

one or more computer-readable storage media; and program instructions stored on the one or more computer-readable storage media to perform operations comprising:

reading a first vector belonging to an unsorted vector space;

generating, based on the first vector, a first sorted vector belonging to a sorted vector space, the sorted vector space comprising a plurality of codewords, wherein generating the first sorted vector comprises generating a first permutation vector indicating a position of each element of the first sorted vector in the first vector;

determining a distance between the first sorted vector and each codeword of the plurality of codewords;

selecting a nearest codeword from the plurality of codewords based on the distances; and providing a compressed representation of the first vector, the compressed representation comprising an identification of the nearest codeword and the first permutation vector.

18. The computer system of claim 17, the operations further comprising:

reading a training dataset comprising a plurality of vectors belonging to the unsorted vector space;

sorting each vector of the plurality of vectors to generate a plurality of sorted vectors belonging to the sorted vector space; and clustering the plurality of sorted vectors in the sorted vector space to generate a codebook comprising the plurality of codewords.

19. The computer system of claim 18, wherein said clustering comprises performing k-means clustering on the sorted vector space.

20. The computer system of claim 17, the operations further comprising:

reading a request to decompress the compressed representation;

identifying the nearest codeword of the compressed representation; and projecting the nearest codeword to the unsorted vector space based on the first permutation vector.

* * * * *